(12) United States Patent
Morishita et al.

(10) Patent No.: US 7,191,856 B2
(45) Date of Patent: Mar. 20, 2007

(54) POWER TRANSMISSION SYSTEM FOR HYBRID VEHICLE

(75) Inventors: Naohisa Morishita, Wako (JP); Nobuhiro Kira, Wako (JP); Masahiro Seki, Wako (JP); Takamichi Shimada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/224,630

(22) Filed: Aug. 21, 2002

(65) Prior Publication Data

US 2003/0057004 A1 Mar. 27, 2003

(30) Foreign Application Priority Data

Aug. 24, 2001 (JP) .............................. 2001-254432

(51) Int. Cl.
 *B60K 6/02* (2006.01)
(52) U.S. Cl. ..................................... 180/65.2; 192/3.25
(58) Field of Classification Search ............... 180/65.2, 180/65.3, 65.4, 65.5, 291, 292; 192/3.21, 192/3.25, 3.34
See application file for complete search history.

(56) References Cited

U.S. PATENT DOCUMENTS

| | | | | |
|---|---|---|---|---|
| 2,614,391 A | * | 10/1952 | Pavlecka ........................ 60/333 |
| 5,427,196 A | * | 6/1995 | Yamaguchi et al. ....... 180/65.2 |
| 5,789,823 A | * | 8/1998 | Sherman ........................ 290/47 |
| 6,041,901 A | * | 3/2000 | Werner et al. .............. 192/3.28 |
| 6,184,603 B1 | * | 2/2001 | Hamai et al. .............. 310/75 R |
| 6,208,036 B1 | * | 3/2001 | Evans et al. ................... 290/46 |
| 6,217,476 B1 | * | 4/2001 | Muller et al. ................... 477/5 |
| 6,258,001 B1 | * | 7/2001 | Wakuta et al. .................. 475/5 |
| 6,340,339 B1 | * | 1/2002 | Tabata et al. ................... 475/5 |
| 6,478,101 B1 | * | 11/2002 | Taniguchi et al. .......... 180/65.2 |
| 6,481,517 B1 | * | 11/2002 | Kobayashi et al. ......... 180/65.3 |

FOREIGN PATENT DOCUMENTS

| | | |
|---|---|---|
| JP | 5-18261 | 3/1993 |
| JP | 08-233064 | 9/1996 |
| JP | 10-141471 | 5/1998 |
| JP | 2000-85387 | 3/2000 |
| JP | 2001-213179 | 8/2001 |

OTHER PUBLICATIONS

Patent Abstracts of Japan for Publication No. 2001-213179, published Aug. 7, 2001—1 page.
Patent Abstracts of Japan for Publication No. 08-233064, published Sep. 10, 1996—1 page.

* cited by examiner

*Primary Examiner*—Frank Vanaman
(74) *Attorney, Agent, or Firm*—Arent Fox PLLC

(57) ABSTRACT

A power transmission system for a hybrid vehicle includes a motor/generator and a torque converter. The motor/generator and the torque converter are disposed in series between a crankshaft of an engine and a main shaft of a transmission. A side plate of the torque converter and a rotor disc of the motor/generator are connected via a drive plate having heat shielding properties and heat releasing properties.

24 Claims, 3 Drawing Sheets

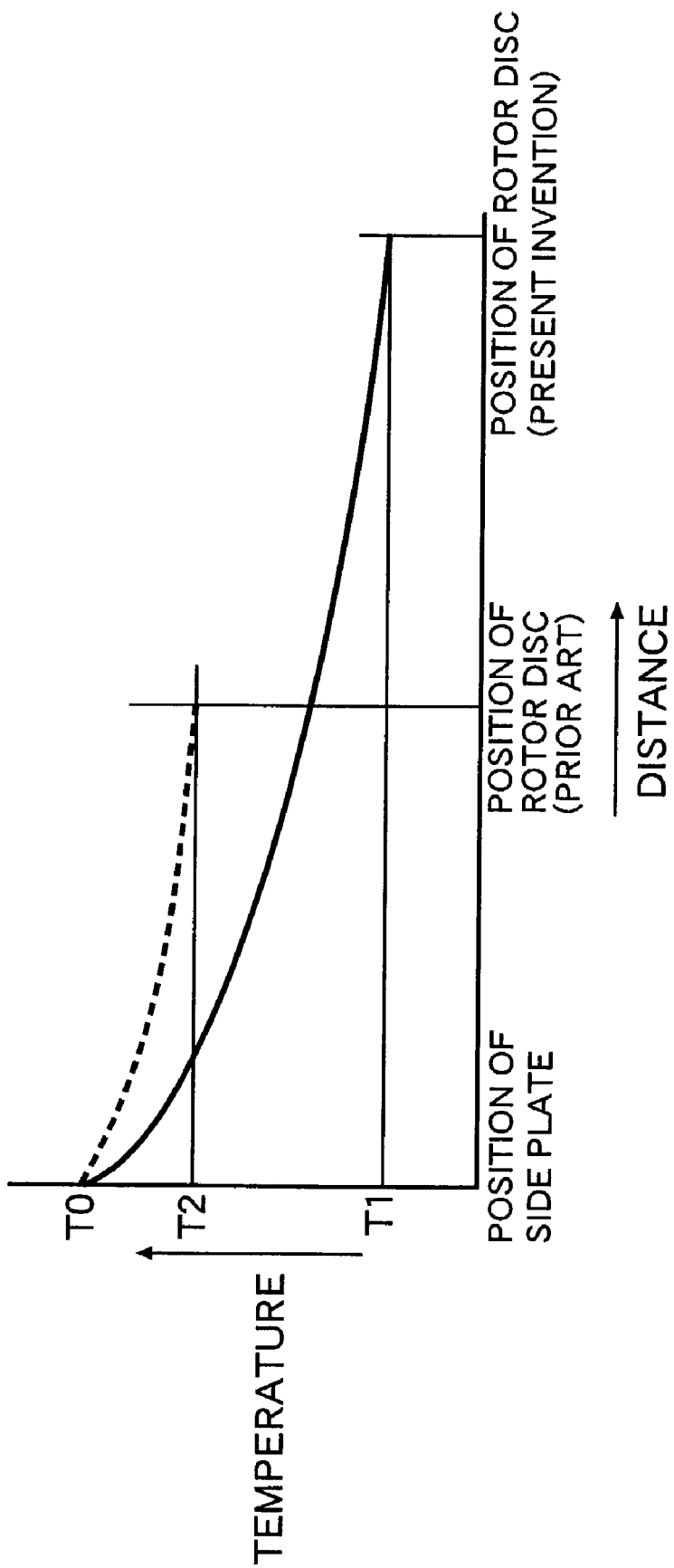

POWER TRANSMISSION SYSTEM FOR HYBRID VEHICLE

BACKGROUND OF THE INVENTION

1. Technical Field of the Invention

The present invention relates to a power transmission system for a hybrid vehicle having a motor/generator and torque converter disposed in series between a crankshaft of an engine and a main shaft of a transmission.

2. Related Art

A conventional hybrid vehicle is disclosed by Japanese Patent Application Laid-open No. 2000-85387 in which a motor/generator and a torque converter are connected in series between a crankshaft of an engine and a main shaft of a transmission. The motor/generator functions as a generator allowing a battery to be charged or energy to be recovered by regenerative braking. The motor/generator also functions as a motor allowing the engine to be started or the output of the engine to be assisted.

However, in the above-described conventional hybrid vehicle, because a side cover of the torque converter and a rotor of the motor/generator face each other via a small gap, radiant heat from the torque converter, which has an increased temperature due to its operation, is transferred to the rotor via the small gap. Therefore, there is a drawback in that the temperature of the motor/generator increases, which deteriorates overall motor/generator performance. Furthermore, because the inner peripheral section of the side cover and the inner peripheral section of the rotor are connected via a boss, the heat of the torque converter is transferred from the side cover to the rotor via the boss, which also increases the temperature of the motor/generator and adds to the overall deterioration of motor/generator performance.

It is an object of the present invention to at least overcome the above-described drawbacks. It is also an object of the present invention to minimize heat transfer from a torque converter to a motor/generator when the motor/generator and the torque converter are disposed between an engine and a transmission.

In order to achieve the above-mentioned objects, in accordance with a first aspect of the present invention, there is provided a power transmission system for a hybrid vehicle having a motor/generator and a torque converter. The motor/generator and the torque converter are disposed in series between a crankshaft of an engine and a main shaft of a transmission. An inner peripheral section of a drive plate extending radially inward from an outer peripheral section of the torque converter is connected to a rotor of the motor/generator.

In accordance with the above-described arrangement, since the inner peripheral section of the drive plate extending radially inward from the outer peripheral section of the torque converter is connected to the rotor of the motor/generator, the radiant heat radiated from the torque converter having an increased temperature is shielded by the drive plate. Accordingly, it is difficult for the heat to reach the motor/generator, which suppresses any degradation in motor/generator performance that typically accompanies an increase in the temperature of the motor/generator. Because the sheet-shaped drive plate is very effective in dissipating heat, the amount of heat transferred from the torque converter to the rotor of the motor/generator via the drive plate is reduced, thereby further effectively preventing any increase in the temperature of the motor/generator.

In accordance with a second aspect of the present invention, in addition to the first aspect, there is provided a power transmission system for a hybrid vehicle wherein a boss projects radially outward from the outer peripheral section of the torque converter, and an outer peripheral section of the drive plate is connected to the boss.

In accordance with the above-described arrangement, connecting the outer peripheral section of the drive plate to the boss projecting radially outward from the outer peripheral section of the torque converter makes it difficult for the heat of the torque converter to be directly transferred to the drive plate, thereby further effectively preventing any increase in the temperature of the motor/generator.

In accordance with a third aspect of the present invention, in addition to the first aspect, there is provided a power transmission system for a hybrid vehicle wherein a gap is disposed in the vicinity of the region where the drive plate is connected to the outer peripheral section of the torque converter.

In accordance with the above-described arrangement, because the gap is provided in the vicinity of the region where the drive plate is connected to the outer peripheral section of the torque converter, the amount of heat transferred from the torque converter to the motor/generator via the drive plate is further reduced.

Furthermore, in accordance with a fourth aspect of the present invention, in addition to the first aspect, there is provided a power transmission system for a hybrid vehicle wherein a gap is disposed in the vicinity of the region where the inner peripheral section of the drive plate is connected to the rotor of the motor/generator.

In accordance with this arrangement, because the gap is provided in the vicinity of the region where the inner peripheral section of the drive plate is connected to the rotor of the motor/generator, the amount of heat transferred from the torque converter to the motor/generator via the drive plate is further reduced.

Moreover, in accordance with a fifth aspect of the present invention, in addition to the first aspect, there is provided a power transmission system for a hybrid vehicle wherein a support hole supporting a shaft end of the output shaft of the torque converter is disposed in the center of the rotor of the motor/generator.

In accordance with this arrangement, because the shaft end of the output shaft of the torque converter is supported in the support hole disposed in the center of the rotor of the motor/generator, the axis of the motor/generator can be made to coincide with the axis of the torque converter while minimizing any increase in the heat conducting area through which heat is transferred from the torque converter to the motor/generator.

A main shaft forms the output shaft of the torque converter of the present invention.

BRIEF DESCRIPTION OF DRAWINGS

The present invention is described below by reference to an embodiment of the present invention shown in the attached drawings, wherein:

FIG. 3 is a graph illustrating the characteristics of heat transfer from a torque converter to a motor/generator.

DETAILED DESCRIPTION OF EMBODIMENT

Figure 1:
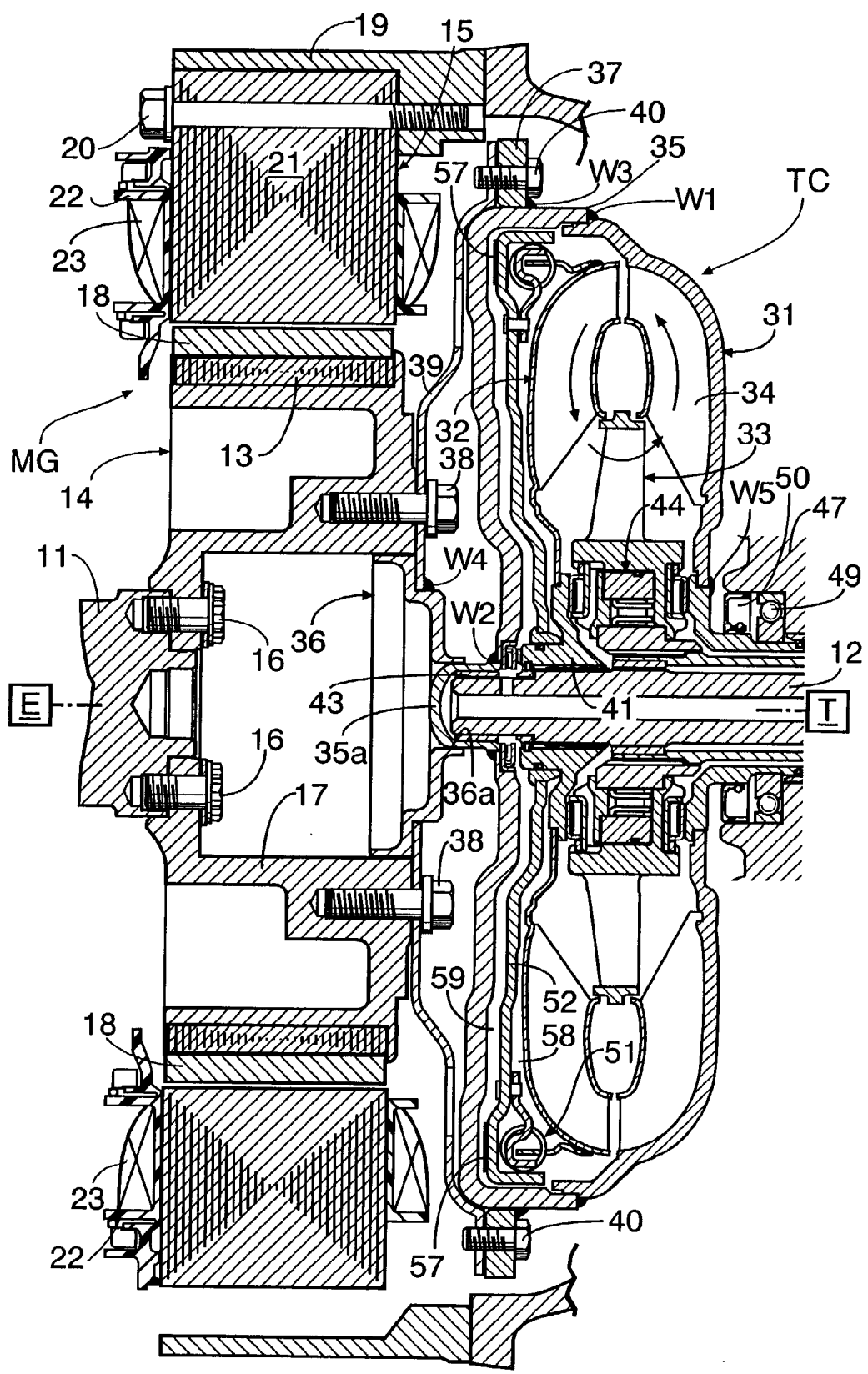
FIG. 1 is a longitudinal cross section of a power transmission system for a hybrid vehicle according to an embodiment of the present invention.

Referring to FIG. 1, a motor/generator MG and a torque converter TC are disposed in series between a crankshaft 11 of an engine E and a main shaft 12 of a transmission T. The motor/generator MG is formed from a rotor 14 and a stator 15. The rotor 14 includes a rotor disc 17 fixed to a shaft end of the crankshaft 11 by bolts 16 and a plurality of permanent magnets 18 fixed to the outer peripheral section of the rotor disc 17 via a laminated steel sheet 13. The stator 15 is fixed to a casing 19 by bolts 20 and includes a laminated sheet core 21 and a plurality of coils 23 wound around the outer circumference of the core 21 via bobbins 22.

Figure 2:
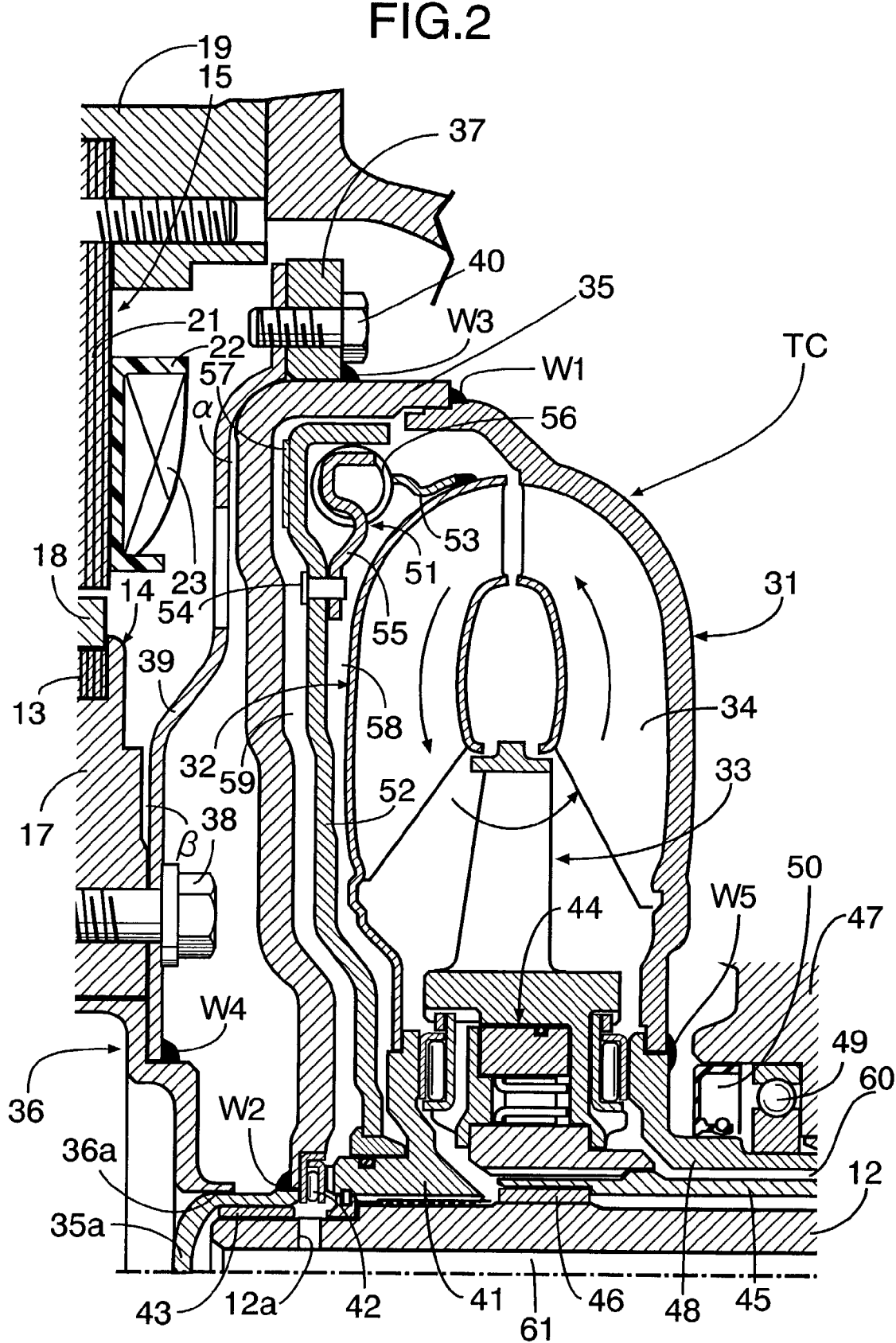
FIG. 2 is an enlarged view of an essential part of the system shown in FIG. 1.

As is clear by referring also to FIG. 2, the torque converter TC includes a pump impeller 31, a turbine runner 32 positioned opposite the pump impeller 31, and a stator 33 disposed between the inner peripheral sections thereof. A circulation path 34 that transmits power via oil is formed between the pump impeller 31, the turbine runner 32, and the stator 33.

Welded by weld W1 to the pump impeller 31 is a side cover 35 that covers the outer face of the turbine runner 32. A support part 35a welded by weld W2 to the center of the outer face of the side cover 35 fits in a support hole 36a formed in a center plate 36 coaxially fitted in the center of the rotor disc 17 of the motor/generator MG. A boss 37 welded by weld W3 to the outer circumference of the side cover 35 is fixed by bolts 40 to the outer peripheral section of a drive plate 39 fixed to the rotor disc 17 by bolts 38. The drive plate 39 is a ring-shaped plate, and the inner peripheral section thereof is coaxially fitted onto a step of the center plate 36 and welded thereto by weld W4.

The outer peripheral section of the drive plate 39 and the outer peripheral section of the side cover 35 are in intimate contact with each other. In order to minimize the contact area, a gap $\alpha$ is formed between the drive plate 39 and the side cover 35. Also, the inner peripheral section of the drive plate 39 and the side face of the rotor disc 17 are in intimate contact with each other. In order to minimize the contact area, a gap $\beta$ is formed between the drive plate 39 and the rotor disc 17.

The main shaft 12 of the transmission T forms the output shaft of the torque converter TC. The outer circumference of the main shaft 12 is spline-coupled with a boss 41 of the turbine runner 32. A thrust bearing 42 is disposed between the boss 41 of the turbine runner 32 and the side cover 35. A bearing bush 43 is disposed between the outer circumference of the extremity of the main shaft 12 and the inner circumference of the support part 35a of the side cover 35. Disposed around the outer circumference of the main shaft 12 is a cylindrical stator shaft 45 supporting the stator 33 via a one-way clutch 44. Disposed between the main shaft 12 and the stator shaft 45 is a bearing bush 46. The right end of the stator shaft 45 is fixed to a transmission case 47 in a non-rotatable manner.

Disposed in a relatively rotatable manner on the outer circumference of the stator shaft 45 is an oil pump hub 48 welded by weld W5 to the pump impeller 31. The oil pump hub 48 drives an oil pump (not shown) for supplying oil to the torque converter TC. The oil pump hub 48 is supported in the transmission case 47 via a ball bearing 49. The gap between the oil pump hub 48 and the transmission case 47 is sealed by a seal 50.

A lockup clutch 51 disposed between the turbine runner 32 and the side cover 35 includes a disc-shaped piston 52 having an inner circumference that is slidably supported on the outer circumference of the boss 41 of the turbine runner 32. Stays 53 welded to the turbine runner 32 and spring seats 55 fixed to the piston 52 via rivets 54 are connected via damper springs 56 disposed in the circumferential direction. Fixed to the outer peripheral section of the piston 52 is a friction lining 57 that can contact the inner wall face of the side cover 35.

A first oil chamber 58 is defined between the piston 52 of the lockup clutch 51 and the turbine runner 32. A second oil chamber 59 is defined between the piston 52 and the side cover 35. The first oil chamber 58 communicates with the space between the pump impeller 31 and the turbine runner 32, and further with a first oil passage 60 formed between the oil pump hub 48 and the stator shaft 45. The second oil chamber 59 communicates with a second oil passage 61 in the center of the main shaft 12 via an oil hole 12a of the main shaft 12. The first oil passage 60 and the second oil passage 61 are alternately connected to the discharge side of the oil pump and an oil reservoir by a lockup control valve that is not shown.

The operation of the embodiment of the present invention having the above-mentioned arrangement is now explained.

In the hybrid vehicle of the present invention, the motor/generator MG functions as a motor when starting and accelerating the vehicle to assist the output of the engine E, thereby enhancing starting performance and acceleration performance, as well as contributing to an improvement of fuel consumption and reduction in emissions. Furthermore, the motor/generator MG functions as a generator when decelerating the vehicle to generate a regenerative braking power, thereby assisting the braking power of a hydraulic brake system as well as recovering the kinetic energy of the vehicle in a battery as regenerated power.

In an idling to low speed driving range of the engine, the second oil passage 61 is connected to the discharge side of the oil pump, and the first oil passage 60 is connected to the oil reservoir. When the rotational torque of the crankshaft 11 of the engine E is transmitted to the oil pump hub 48 via the rotor disc 17 of the motor/generator MG, the drive plate 39, the boss 37, the side cover 35, and the pump impeller 31, the oil pump is driven, and the oil discharged from the oil pump passes through the second oil passage 61 and the oil hole 12a and flows into the second oil chamber 59. As a result, the piston 52 moves toward the first oil chamber 58, the friction lining 57 is detached from the side cover 35, and the lockup clutch 51 is disengaged, thereby allowing relative rotation between the pump impeller 31 and the turbine runner 32.

The oil flowing from the second oil chamber 59 into the first oil chamber 58 flows into the circulation path 34 through a space between the pump impeller 31 and the turbine runner 32 to fill the circulation path 34 and then returns to the oil reservoir via the first oil passage 60.

When the rotation of the crankshaft 11 is transmitted to the pump impeller 31, the rotation of the pump impeller 31 causes the oil filling the circulation path 34 to circulate from the pump impeller 31 to the turbine runner 32 to the stator 33 and to the pump impeller 31 while transmitting the rotational torque of the pump impeller 31 to the turbine runner 32 in this process, thereby driving the main shaft 12. If a torque amplifying effect is generated between the pump impeller 31 and the turbine runner 32, the accompanying reaction force is borne by the stator 33, and the stator 33 is non-rotatably fixed by the one-way clutch 44.

When the speed ratio of the torque converter TC approaches one (1) in response to an increase in engine rotational speed, and the torque amplifying action by the stator 33 is no longer exerted, the one-way clutch 44 slips so that the stator 33 becomes free and rotates in the same direction as the pump impeller 31 and the turbine runner 32. When the torque converter TC is in such a coupling state, the first oil passage 60 is connected to the discharge side of the oil pump and the second oil passage 61 is connected to the oil reservoir. As a result, the oil discharged from the oil pump is supplied from the first oil passage 60 to the first oil chamber 58 via the circulation path 34, adversely to the above-mentioned process, whereas the second oil chamber 59 is opened to the oil reservoir via the second oil passage 61. Thus, the piston 52 is pressed from the first oil chamber 58 side to the second oil chamber 59 side, the friction lining 57 contacts the side cover 35, and the turbine runner 32 is unified with the side cover 35.

When the lockup clutch 51 is engaged in this way, the torque of the crankshaft 11 is transmitted from the side cover 35 to the main shaft 12 via the piston 52 and boss 41, thus eliminating slip between the pump impeller 31 and the turbine runner 32 to enhance transmission efficiency. Fluctuation in the engine torque during engagement of the lockup clutch 51 is cushioned by the damper springs 56.

When in operation, the torque converter TC generates heat due to frictional heat generated from slip of the lockup clutch 51 or circulation of the oil, and radiant heat is radiated to the outside from the pump impeller 31 and the side cover 35 forming the outer shell of the torque converter TC. If the radiant heat radiated from the side cover 35 acts directly on the motor/generator MG, the temperature of the motor/generator MG increases, which may deteriorate overall performance. However, because the drive plate 39 is disposed between the side cover 35 of the torque converter TC and the motor/generator MG, the above-mentioned radiant heat is shielded by the drive plate 39, thereby suppressing any increase in the temperature of the motor/generator MG.

The heat of the side cover 35 is transferred through the drive plate 39 as conduction heat, thus increasing the temperature of the rotor disc 17 of the rotor 14 of the motor/generator MG. However, because the drive plate 39 is formed from a plate that is very effective in dissipating heat, the gap $\alpha$ is formed between the outer peripheral section of the drive plate 39 and the side cover 35, and the gap $\beta$ is formed between the drive plate 39 and the rotor disc 17, it is possible to minimize the transfer of conduction heat via the drive plate 39, thereby suppressing any increase in the temperature of the motor/generator MG. Furthermore, because the boss 37 is disposed between the side cover 35 and the drive plate 39, transfer of conduction heat from the side cover 35 to the drive plate 39 is also suppressed.

Although it is difficult to coaxially position the motor/generator MG and the torque converter TC only by connecting the rotor disc 17 and the side cover 35 via the drive plate 39, supporting the support part 35a provided in the center of the side cover 35 in the support hole 36a of the center plate 36 fixed to the rotor disc 17 results in the axis of the motor/generator MG to coincide precisely with the axis of the torque converter TC. Moreover, because the contact area between the support part 35a and the support hole 36a is small, the amount of heat transferred from the torque converter TC to the motor/generator MG via the contact area is small, thereby suppressing any increase in the temperature of the motor/generator MG.

The solid line in FIG. 3 shows the characteristics of the change in temperature relative to the distance on the drive plate 39 measured from the side cover 35 toward the rotor disc 17. The temperature T0 at the radially outer end of the drive plate 39 connected to the side cover 35 decreases to T1 at the radially inner end of the drive plate 39 connected to the rotor disc 17 because of the release of heat while it is being transferred through the drive plate 39 having a high heat releasing ability and a long heat transfer route. On the other hand, the broken line shows the characteristics of the related art disclosed by Japanese Patent Application Laid-open No. 2000-85387 in which a side cover and a rotor disc are connected via a short hub. In the related art, because a relatively small amount of heat is released while it is being transferred through the short hub having a poor heat releasing ability and a short heat transfer route, the temperature T0 at the side cover 35 merely decreases to T2 at the rotor disc.

An embodiment of the present invention has been described in detail above, but the present invention can be modified in a variety of ways without departing from the spirit and scope of the invention. For example, the motor/generator MG of the embodiment exhibits the functions of both a motor and a generator, but it may be one that exhibits only one of the functions of a motor and a generator.

We claim:

1. A power transmission system for a hybrid vehicle, comprising:
    a motor/generator having a stator and a rotor; and
    a torque converter, the motor/generator and the torque converter being disposed in series between a crankshaft of an engine and a main shaft of a transmission;
    wherein an inner peripheral section of a drive plate extending radially inward from an outer peripheral section of the torque converter is connected directly to the rotor of the motor/generator,
    wherein a radially extending side cover covers an outer face of the torque converter,
    wherein a support hole supporting a shaft end of the main shaft of the transmission is provided in a center of the rotor of the motor/generator,
    wherein the torque converter is provided so as to be radially overlapped with the stator and the rotor of the motor/generator when viewed in an axial direction of the crankshaft, and
    wherein the side cover extends so as to lie between the drive plate and the torque converter over a substantially whole radial extent of the torque converter.

2. The power transmission system for a hybrid vehicle according to claim 1, wherein a boss projects radially outward from the outer peripheral section of the torque converter, and the outer peripheral section of the drive plate is also connected to the boss.

3. The power transmission system for a hybrid vehicle according to claim 1, wherein a gap is provided near a region where the drive plate is connected to the outer peripheral section of the torque converter.

4. The power transmission system for a hybrid vehicle according to claim 1, wherein a gap is provided near a region where the radially inner peripheral section of the drive plate is connected to the rotor of the motor/generator.

5. The power transmission system for a hybrid vehicle according to claim 1, wherein said motor/generator extends over a predetermined area in the axial direction of the crankshaft of the engine, and wherein said drive plate is connected to the rotor of the motor/generator within said predetermined area.

6. The power transmission system for a hybrid vehicle according to claim 5, wherein the torque converter comprises a pump impeller, a turbine runner, and the side cover, which covers the turbine runner.

7. The power transmission system for a hybrid vehicle according to claim 6, wherein a boss projects radially outward from the outer peripheral section of said side cover, and wherein the outer peripheral section of the drive plate is connected to the boss.

8. A power transmission system for a hybrid vehicle, comprising:
a motor/generator having a stator and a rotor; and
a torque converter having a turbine runner, the motor/generator and the torque converter being disposed in series between a crankshaft of an engine and a main shaft of a transmission;
wherein an inner peripheral section of a drive plate extending radially inward from an outer peripheral section of the torque converter is connected directly to the rotor of the motor/generator,
wherein a radially extending side cover completely disposed between the drive plate and an outer periphery of the turbine runner covers an outer face of the torque converter,
wherein the torque converter is provided so as to be radially overlapped with the stator and the rotor of the motor/generator when viewed in an axial direction of the crankshaft; and
wherein a center plate is fixed to a center of the rotor and a support hole is formed in the center plate.

9. The power transmission system for a hybrid vehicle according to claim 8, wherein the side cover extends so as to lie between the drive plate and the torque converter over a substantially whole radial extent of the torque converter.

10. The power transmission system for a hybrid vehicle according to claim 8, wherein a gap is provided near a region where the drive plate is connected to the outer peripheral section of the torque converter.

11. The power transmission system for a hybrid vehicle according to claim 8, wherein a gap is provided near a region where the inner peripheral section of the drive plate is connected to the rotor of the motor/generator.

12. The power transmission system for a hybrid vehicle according to claim 8, wherein said motor/generator extends over a predetermined area in the axial direction of the crankshaft of the engine, and wherein said drive plate is connected to the rotor of the motor/generator within said predetermined area.

13. The power transmission system for a hybrid vehicle according to claim 12, wherein the torque converter further comprises a pump impeller engaging the side cover.

14. The power transmission system for a hybrid vehicle according to claim 13, wherein a boss projects radially outward from the outer peripheral section of said side cover, and wherein the outer peripheral section of the drive plate is connected to the boss.

15. A power transmission system for a hybrid vehicle, comprising:
a motor/generator; and
a torque converter having a turbine runner, the motor/generator and the torque converter being disposed in series between a crankshaft of an engine and a main shaft of a transmission;
wherein an inner peripheral section of a drive plate extending radially inward from an outer peripheral section of the torque converter is connected directly to a rotor of the motor/generator,
wherein a radially extending side cover completely disposed between the drive plate and an outer periphery of the turbine runner covers an outer face of the torque converter, and
wherein an outer peripheral section of the drive plate, which faces away from and in an opposite direction to the inner peripheral section of the drive plate and toward the outer peripheral section of the torque converter, is connected to an outer peripheral section of the side cover, which faces away from the outer peripheral section of the torque converter and in an opposite direction to an inner peripheral section of the side cover, wherein the inner peripheral section of the side cover faces the outer peripheral section of the torque converter, and wherein a support hole supporting a shaft end of the main shaft of the transmission is provided in a center of the rotor of the motor/generator.

16. The power transmission system for a hybrid vehicle according to claim 15, wherein a boss projects radially outward from the outer peripheral section of the torque converter, and the outer peripheral section of the drive plate is also connected to the boss.

17. The power transmission system for a hybrid vehicle according to claim 15, wherein a gap is provided near a region where the drive plate is connected to the outer peripheral section of the torque converter.

18. The power transmission system for a hybrid vehicle according to claim 15, wherein a gap is provided near a region where the inner peripheral section of the drive plate is connected to the rotor of the motor/generator.

19. The power transmission system for a hybrid vehicle according to claim 18, wherein said motor/generator extends over a predetermined area in an axial direction of the crankshaft of the engine, and wherein said drive plate is connected to the rotor of the motor/generator within said predetermined area.

20. The power transmission system for a hybrid vehicle according to claim 19, wherein the torque converter further comprises a pump impeller engaging the side cover.

21. The power transmission system for a hybrid vehicle according to claim 20, wherein a boss projects radially outward from the outer peripheral section of said side cover, and wherein the outer peripheral section of the drive plate is connected to the boss.

22. The power transmission system for a hybrid vehicle according to claim 15, further comprising a center plate fixed to the center of the rotor, wherein the support hole is formed in the center plate.

23. A power transmission system for a hybrid vehicle, comprising:
a motor/generator having a stator and a rotor;
a torque converter, the motor/generator and the torque converter being disposed in series between a crankshaft of an engine and a main shaft of a transmission;
wherein an inner peripheral section of a drive plate extending radially inward from an outer peripheral section of the torque converter is connected directly to the rotor of the motor/generator,
wherein a radially extending side cover covers an outer face of the torque converter,
wherein a support hole supporting a shaft end of the main shaft of the transmission is provided in a center of the rotor of the motor/generator, and
wherein the torque converter is provided so as to be radially overlapped with the stator and the rotor of the motor/generator when viewed in an axial direction of the crankshaft; and
a center plate fixed to the center of the rotor, wherein the support hole is formed in the center plate.

24. A power transmission system for a hybrid vehicle comprising:
- a motor/generator having a stator and a rotor; and
- a torque converter having a turbine runner, the motor/generator and the torque converter being disposed in series between a crankshaft of an engine and a main shaft of a transmission;
- wherein an inner peripheral section of a drive plate extending radially inward from an outer peripheral section of the torque converter is connected directly to the rotor of the motor/generator,
- wherein a radially extending side cover completely disposed between the drive plate and an outer periphery of the turbine runner covers an outer face of the torque converter, and
- wherein the torque converter is provided so as to be radially overlapped with the stator and the rotor of the motor/generator when viewed in an axial direction of the crankshaft,
- wherein a boss projects radially outward from the outer peripheral section of the torque converter, and the outer peripheral section of the drive plate is also connected to the boss.

* * * * *